J. M. WOODS.
RESILIENT WHEEL.
APPLICATION FILED AUG. 2, 1916.
1,336,060.
Patented Apr. 6, 1920.
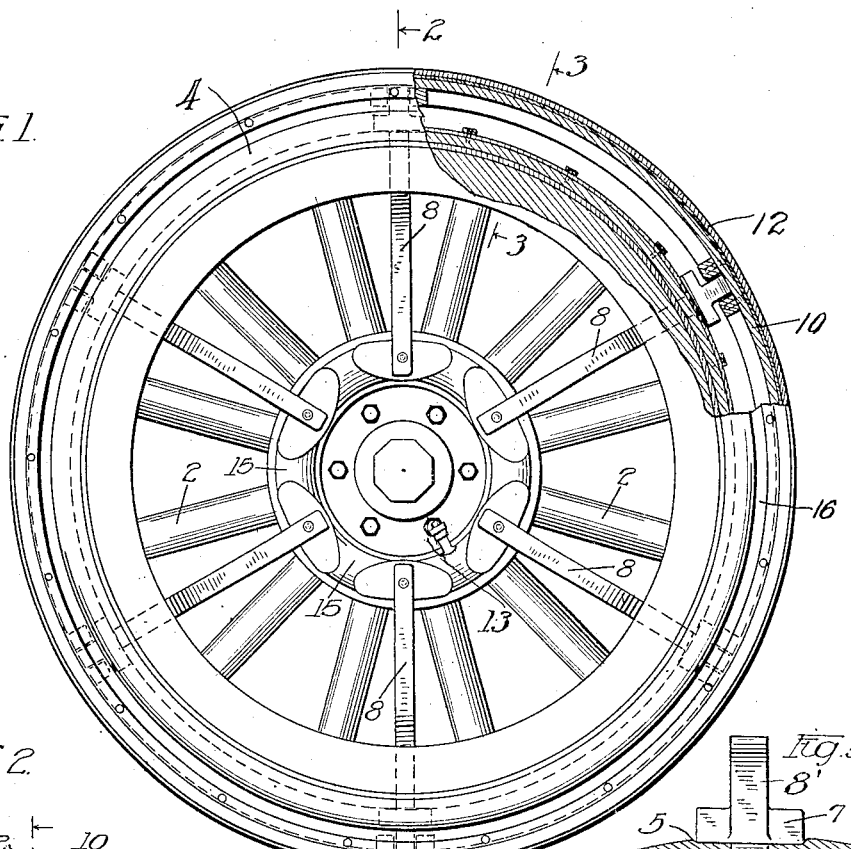
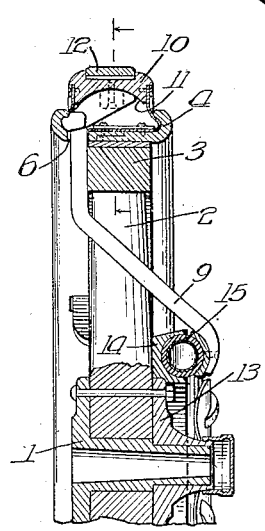
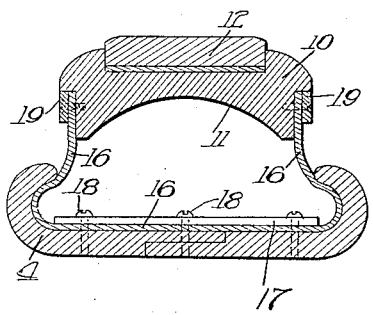
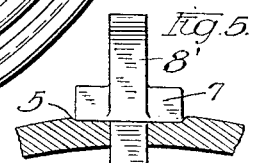
Witnesses:
Arthur W. Carlson
Sebastian Hinton
Inventor
Joseph M. Woods
by Wallace R Lane
Atty

UNITED STATES PATENT OFFICE.

JOSEPH M. WOODS, OF CHICAGO, ILLINOIS, ASSIGNOR TO DANIEL O'LEARY, OF CHICAGO, ILLINOIS.

RESILIENT WHEEL.

1,336,060.  Specification of Letters Patent.  Patented Apr. 6, 1920.

Application filed August 2, 1916. Serial No. 112,635.

*To all whom it may concern:*

Be it known that I, JOSEPH M. WOODS, a citizen of the United States, residing at Chicago, in the county of Cook and State of Illinois, have invented certain new and useful Improvements in Resilient Wheels, of which the following is the specification.

This invention relates to puncture proof resilient wheels, and particularly to a wheel provided with a solid tread which cannot be punctured, but acting upon the pneumatic principle which has been found to be the most practical and efficient cushioning system for wheels.

It is an object of the invention to provide a vehicle wheel in which the pressure of the roadway upon the tread will be cushioned by a pneumatic device acting precisely as does the ordinary pneumatic tire, but which is so situated as to be entirely removed from contact with the roadway, and thus not liable to be punctured.

It is another object of my invention to provide a device of the character described, simple, economical, and efficient in construction and operation, and adapted to be applied to the ordinary clencher rim so that the device of my invention may be applied to the prevailing type of automobile wheels without necessitating any change therefor.

Other objects and advantages of my invention will appear as the description to follow proceeds.

Figure 1 is an elevation, partly broken away, of a wheel constructed according to my invention; Fig. 2 is a fragmentary cross-sectional view on the line 2—2 of Fig. 1; Fig. 3 is an enlarged detail cross-sectional view on the line 3—3 of Fig. 1; Fig. 4 is a perspective view of one of the pressure communicating devices; Fig. 5 is an enlarged detail elevation showing the mounting of one of said devices.

In the drawings, 1 represents a hub of an automobile wheel of ordinary construction, provided with spokes 2 and a felly 3, upon which is situated the separable clencher rim 4 of customary form. The clencher rim 4 is made according to my invention with a plurality of slight depressions 5 therein, at the middle of which are apertures 6 through the rim at one side of the felly. Situated in the depressions 5 are the cross bars 7 of levers 8, which are bent backwardly as indicated at 9, and are provided with curved pressure plates 9' at their bottoms. Above the cross bars 7, the levers 8 are provided with arms 8', having curved top surfaces, as clearly indicated in Fig. 4, and adapted to fit the inner surface of the tire to be described. The cross bars 7 are formed integrally with the levers 8 and are provided with rounded outer faces 7' to fit into the curved inner flanges of the clencher rim. The lever arms 8 are situated in the apertures 6, with the cross bars 7 situated in the depressions 5, as clearly to be gathered from Figs. 2, 4, and 5, the portions 8' of the levers 8 projecting outwardly above the curved clencher rim, while the curved portion 9 projects inwardly and transversely, as shown.

Mounted upon the portions 8' of the levers 8 is an outer rim of steel or the like, 10, having a curved inner surface 11, adapted to accurately fit the curved portions 8' of the bent levers 8. The rim 10 is provided with an annular groove in which is fastened by any suitable securing means the preferable rubber tread 12. Concentric with and situated upon the hub flange 13 of the wheel and firmly secured in place, is a circular member 14 having therein a circular channel in which is situated a miniature pneumatic tube 15, upon which bear the curved pressure plates 9'.

To prevent mud and dirt getting access to and clogging the mechanism above described, I completely inclose the space between the rim 10 and the clencher rim 4 by means of a strip 16 of leather or other suitable material secured to the clencher rim 4 by small cross pieces 17, in turn secured by screws 18, the strip 16 having its edges turned outwardly and each secured by means of strips 19 in cut away seats in the rim 10, as clearly indicated in Fig. 3. The leather strip 16 is provided with apertures to permit the levers 8 to pass therethrough. These apertures, however, are just barely large enough to receive the shanks of the levers 8 and do not permit the entry of sufficient foreign matter to prevent the smooth operation of the device.

The upward force exerted by the roadway or other supporting surface upon the rim 10 will act through bent levers 8 and be transmitted into pressure against the pneumatic tube 15 by the pressure plates 9', the action being in its nature precisely the same as if a pneumatic tire were located about the outer periphery of the wheel, except for the multiplying operation of the lever 8 which may, of course, be compensated for by varying the pressure in the pneumatic tube 15. When one of the levers 8 is vertically located directly over the roadway, as shown in Fig. 1, this lever will take the entire weight of the vehicle. As the wheel moves on, however, the action of the rim 10 will be distributed between this lever and the next successive one coming into position, so that no matter whether one or more than one of the levers are being affected by the pressure on the wheel upon the roadway, the action will be uniform and even throughout the entire rotation of the wheel and corresponding precisely at all times in its nature to that of a pneumatic tire upon the vehicle. It is of course to be understood that any desired number of levers 8 may be employed in the carrying of my invention into practice, six being shown in this instance—one in every other spoke interval in a twelve-spoke automobile wheel. This, however, is purely optional. One lever might be employed in every spoke interval or, if desired, more than one in each spoke interval, the pneumatic tube construction being duplicated upon the opposite side of the wheel and part of the levers 8 being faced in opposite directions to correspond therewith, such modifications being entirely within the purport and scope of my invention, it being merely a matter of accommodating the invention to the particular demands to be made upon it in practice.

My invention is peculiarly applicable to heavy work such as truck work, as well as for pleasure cars, for the reason that on account of the long lever arm on the pneumatic tube side of the fulcrum 7, the effective resiliency of the pneumatic tube 15 is greatly magnified at the tread portion of the wheel so as to take care of excessive loads with comparative ease.

It is an important feature of my invention that the tread 12, being carried upon a steel rim 10, is practically incompressible, so that a rolling contact with the road is made by a true circle at all times, thus avoiding the flat contact involving considerable area, which as is well known, produces a continual drag in the case of the customary pneumatic tire.

Having now described my invention, I claim:—

1. In a vehicle wheel a fixed rim, a movable rim, a tread portion on said movable rim, pneumatic means substantially removed from said movable rim, connecting levers between said movable rim and said pneumatic means, said levers being fulcrumed between their ends on said fixed rim and engaging said movable rim at one end and directly engaging said pneumatic means at their other ends, whereby the pressure communicated to said tread portion is communicated to and resisted by said pneumatic means.

2. In a vehicle wheel a fixed rim, a movable rim having a tread portion, a pneumatic tube removed inwardly from said movable rim, and connecting levers pivoted in said fixed rim for movement transversely of the wheel, said levers engaging both the movable rim and the pneumatic tube whereby movement of the rim will be yieldably resisted by the tube.

3. In a vehicle wheel, a hub having spokes, a rim fixed upon said spokes, and having apertures therein, levers mounted in said apertures and fulcrumed on said rim, the outer portions of said levers having a curved face, a tread portion having a curved inner face carried upon the curved faces of the outer portions of said levers, and resilient means adapted to resist the movement in one direction of the inner portions of said levers.

4. A vehicle wheel comprising a hub having spokes and a rim rigidly fastened thereto, levers fulcrumed in said rim at one side of said spokes, and having outer portions adapted to receive the pressure of the roadway, a pneumatic tube fastened upon said wheel and adapted to resist the consequent end movement of the inner portions of said levers.

5. In an apparatus of the class described, a wheel having a fixed rim, having apertures therein, levers passing through said apertures and fulcrumed in said rim, a movable rim carried upon the outer portions of said levers, cushioning means for the inner end of said levers, and a flexible covering device closing the space between said inner and outer rims to protect the same from foreign matter.

6. A vehicle wheel comprising a hub having a fixed rim rigidly connected thereto, a circular device attached to said wheel adjacent said hub and carrying a pneumatic tube, a tread portion outside said fixed rim, and levers fulcrumed in said rim, and comprising short arms adapted to fit the inner surface of said tread portion, the long arms crossing between the spokes of said wheel and terminating in pressure surfaces to communicate the pressure imposed upon said rim to said pneumatic tube.

7. In a vehicle wheel a fixed rim, a movable rim having a transversely curved inner face, resilient cushioning means, levers pivoted in said fixed rim and each having a portion to fit said transversely curved face, said levers also engaging said cushioning means whereby to yieldably resist movement of the movable rim.

8. In a vehicle wheel a fixed rim having apertures therein, a movable rim, levers fulcrumed in said apertures and extending therethrough, resilient means substantially removed from said movable rim, said levers being engaged by said movable rim at their outer ends, and their inner ends engaging said resilient means, whereby pressure imposed upon said tread portion will be communicated to and resisted by said resilient means.

9. In a vehicle wheel a fixed rim, a movable rim having a transversely curved inner surface, a plurality of rocking devices fulcrumed for pivotal movement in said fixed rim, the outer ends of said devices being curved to engage and fit the inner curvature of said movable rim, and resilient means substantially removed from said movable rim for engagement with the inner end of said rocking devices to resist the pressure transmitted to said devices by the movable rim.

In witness whereof, I hereunto subscribe my name to this specification in the presence of two witnesses.

JOSEPH M. WOODS.

Witnesses:
 DAVIE O. LONG,
 LEPARTRAM HUNTER.